US010984229B2

(12) United States Patent
Talbot (10) Patent No.: US 10,984,229 B2
(45) Date of Patent: Apr. 20, 2021

(54) INTERACTIVE SIGN LANGUAGE RESPONSE SYSTEM AND METHOD

(71) Applicant: Chris Talbot, Moorpark, CA (US)

(72) Inventor: Chris Talbot, Moorpark, CA (US)

( * ) Notice: Subject to any disclaimer, the term of this patent is extended or adjusted under 35 U.S.C. 154(b) by 108 days.

(21) Appl. No.: 16/158,284

(22) Filed: Oct. 11, 2018

(65) Prior Publication Data

US 2020/0117888 A1   Apr. 16, 2020

(51) Int. Cl.
*G06K 9/00* (2006.01)
*H04N 7/14* (2006.01)

(52) U.S. Cl.
CPC ..... *G06K 9/00355* (2013.01); *G06K 9/00718* (2013.01); *H04N 7/147* (2013.01)

(58) Field of Classification Search
CPC . G06K 9/00355; G06K 9/00718; H04N 7/147
See application file for complete search history.

(56) References Cited

U.S. PATENT DOCUMENTS

| | | | |
|---|---|---|---|
| 5,382,972 A | 1/1995 | Karnes | |
| 5,978,014 A | 11/1999 | Martin et al. | |
| 6,345,827 B1 | 2/2002 | Benoit | |
| 7,046,779 B2 | 5/2006 | Hesse | |
| 7,142,642 B2 | 11/2006 | McClelland et al. | |
| 7,206,386 B2 | 4/2007 | Clapp et al. | |
| 7,349,955 B1 | 3/2008 | Korb et al. | |
| 7,573,985 B2 | 8/2009 | McClelland et al. | |
| 7,746,984 B2 | 6/2010 | Nola et al. | |
| 7,899,167 B1 | 3/2011 | Rae | |
| 8,010,706 B1 | 8/2011 | Rein et al. | |
| 8,204,179 B2 | 6/2012 | Goldman et al. | |
| 8,374,325 B2 | 2/2013 | Robotka | |
| 8,528,068 B1 | 9/2013 | Weglein et al. | |
| 8,739,234 B1 | 5/2014 | Cheung et al. | |
| 8,817,966 B2 | 8/2014 | Wrench | |
| 9,106,789 B1 | 8/2015 | Shipman et al. | |
| 9,247,200 B2 | 1/2016 | Gupta et al. | |
| 9,330,088 B2 | 5/2016 | Fitterer et al. | |
| 9,344,674 B2 * | 5/2016 | Talbot | G09B 21/009 |
| 9,571,788 B2 | 2/2017 | Hamling et al. | |
| 9,615,060 B1 | 4/2017 | Hodge | |
| 9,628,620 B1 | 4/2017 | Rae et al. | |
| 9,667,763 B1 | 5/2017 | Keiser et al. | |
| 9,794,399 B1 | 10/2017 | Hodge | |

(Continued)

*Primary Examiner* — Amara Abdi
(74) *Attorney, Agent, or Firm* — Scheinberg & Associates, PC; Michael O. Scheinberg (57) ABSTRACT

An interactive sign language response (ISLR) system and method are described herein. The method includes receiving, by the interactive sign language response system, a video call from a videophone used by a video calling party, the video call including a video signal between the videophone and the interactive sign language response system; sending, by the interactive sign language response system and by way of the video call, a video prompt to be displayed on the videophone of the video calling party; and detecting, by the interactive sign language response system and by way of the video call, a response from the video calling party to the video prompt. In at least one embodiment, the interactive sign language recognition system performs automatic sign language recognition to determine one or more gestures in the video signal.

22 Claims, 5 Drawing Sheets

(56) References Cited

U.S. PATENT DOCUMENTS

| | | |
|---|---|---|
| 9,798,722 B2 | 10/2017 | Michaelis |
| 2003/0069997 A1 | 4/2003 | Bravin et al. |
| 2005/0086699 A1 | 4/2005 | Hahn et al. |
| 2005/0129185 A1 | 6/2005 | McClelland et al. |
| 2005/0238143 A1 | 10/2005 | Clapp et al. |
| 2006/0026001 A1 | 2/2006 | Bravin et al. |
| 2006/0074624 A1 | 4/2006 | Sahashi |
| 2006/0285652 A1 | 12/2006 | McClelland et al. |
| 2007/0041545 A1 | 2/2007 | Gainsboro |
| 2009/0027485 A1* | 1/2009 | Erhart .................... H04N 7/144 348/14.12 |
| 2009/0028300 A1* | 1/2009 | McLaughlin ..... H04M 3/42391 379/52 |
| 2009/0174759 A1 | 7/2009 | Yeh et al. |
| 2009/0262906 A1 | 10/2009 | Goldman et al. |
| 2010/0066803 A1 | 3/2010 | Robotka |
| 2011/0261941 A1 | 10/2011 | Walters et al. |
| 2012/0176466 A1 | 7/2012 | Wrench |
| 2012/0196580 A1 | 8/2012 | Simmons et al. |
| 2012/0224678 A1 | 9/2012 | Walters et al. |
| 2013/0194377 A1 | 8/2013 | Humphries |
| 2014/0267540 A1 | 9/2014 | Torgersrud |
| 2015/0022616 A1 | 1/2015 | Talbot |
| 2015/0271444 A1 | 9/2015 | DeFazio et al. |
| 2016/0212259 A1 | 7/2016 | Higgs |
| 2017/0017876 A1 | 1/2017 | Modha |
| 2017/0026518 A1 | 1/2017 | Averiii et al. |
| 2017/0034479 A1 | 2/2017 | Thelia et al. |
| 2017/0155762 A1 | 6/2017 | Hamling et al. |
| 2017/0280100 A1 | 9/2017 | Hodge |
| 2017/0318143 A1 | 11/2017 | Hodge |
| 2018/0013886 A1 | 1/2018 | Rae et al. |
| 2018/0063325 A1* | 3/2018 | Wilcox ................ G09B 21/001 |

\* cited by examiner

INTERACTIVE SIGN LANGUAGE RESPONSE SYSTEM AND METHOD

TECHNICAL FIELD

The present invention relates to telecommunications services for callers who are deaf, hard-of-hearing, or speech impaired (D-HOH-SI).

BACKGROUND

Interactive voice response (IVR) is a technology that allows a computer to interact with humans through the use of voice and dual tone multifrequency (DTMF) tones input via a telephone keypad. In telecommunications, IVR allows customers to interact with a company's host system via a telephone keypad or by speech recognition, after which services can be inquired about through the IVR dialogue. IVR systems can respond with pre-recorded or dynamically generated audio to further direct users on how to proceed. IVR systems deployed in the network are sized to handle large call volumes and also used for outbound calling, as IVR systems are more intelligent than many predictive dialer systems. IVR systems can be used for mobile purchases, banking payments and services, retail orders, utilities, travel information and weather conditions. The purpose of an IVR system is to take audio input in the form of a spoken word signal or a DTMF tone, process it, and return a result.

Figure 1:
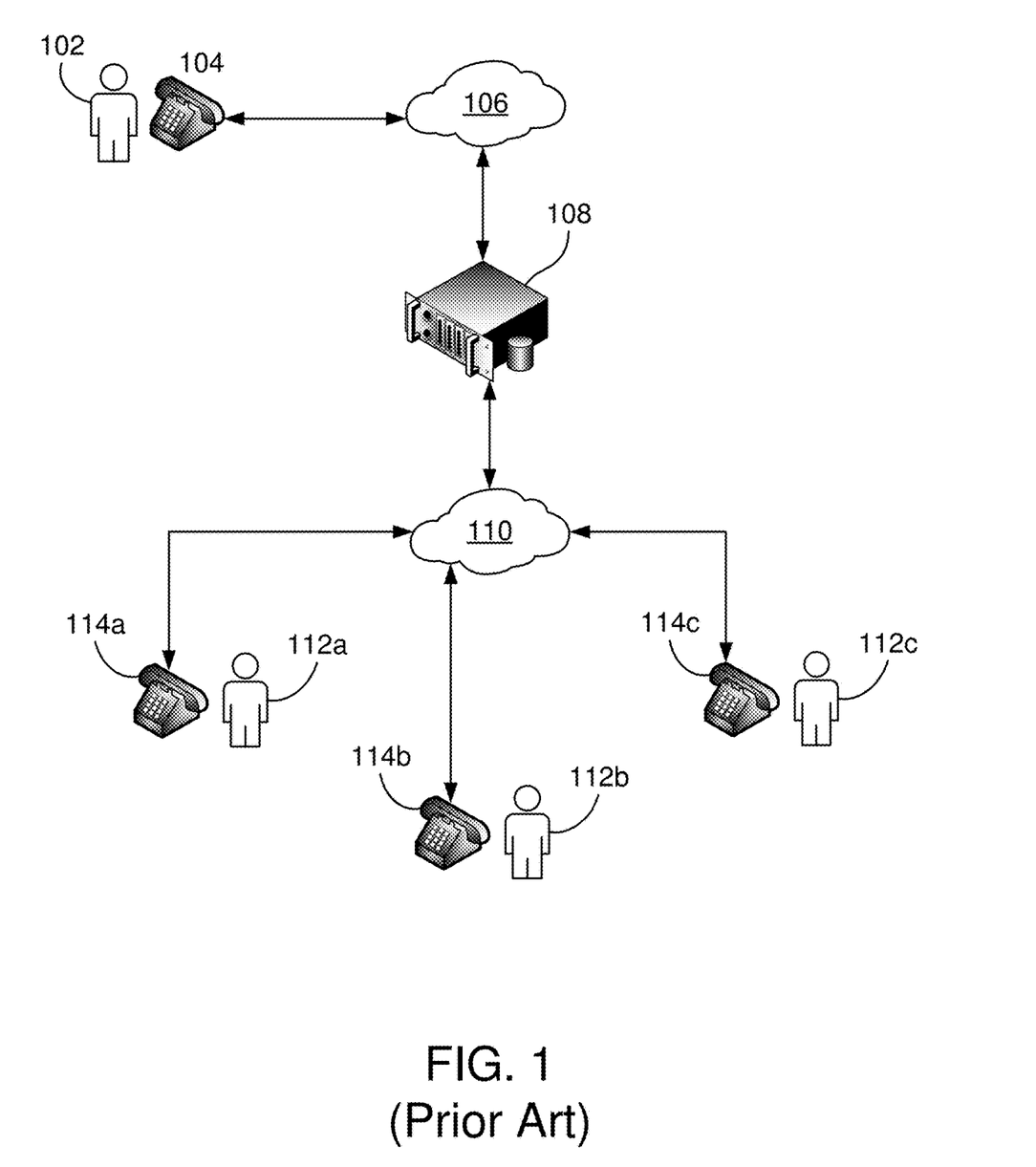
FIG. 1 shows a prior art interactive voice response (IVR) system.

FIG. 1 shows a prior art interactive voice response (IVR) system. Calling party 102 uses telephone 104 to place a call via public telephone network 106, such as the public switched telephone network (PSTN), to a telephone number associated with IVR system 108. Typically, IVR system 108 is operated by a business or enterprise to facilitate call management and customer service. IVR system 108 answers the call from calling party 102 and presents calling party 102 with one or more voice prompts. Calling party 102, upon hearing the voice prompts on telephone 104, responds to the prompts either by pressing keys on telephone 104 to generate dual tone multifrequency (DTMF) tones and/or by speaking in spoken language that IVR system 108 recognizes. IVR system 108 recognizes the DTMF tones or uses automated speech recognition to determine the response of calling party 102 and takes action based upon the determined response. If the determined response requires the call to be connected to a human call agent, IVR system 108 automatically connects the call via private telephone network 110, such as a private branch exchange (PBX), to the next available human call agent 112a-c using telephone 114a-c.

For persons who are who are deaf, hard-of-hearing, or speech impaired (D-HOH-SI), IVR systems are inadequate or unusable. Interaction with an IVR system requires the calling party to be able to hear the audio prompts from the IVR system and respond. A calling party who is deaf or hard-of-hearing may not be able to hear and/or understand the voice prompts from the IVR system. Further, a calling party who is speech impaired may not be able to speak with sufficient clarity to interact with an IVR system that requires voice responses.

The availability of affordable, high-speed packet-switched communications has led to the growth in the use of Video Relay Service (VRS) communication by D-HOH-SI persons. Using VRS equipment, D-HOH-SI persons may place video calls to communicate between themselves and hearing individuals (non-D-HOH-SI) using sign language (SL). VRS equipment enables D-HOH-SI persons to talk to hearing individuals via a sign language interpreter (SLI), who uses a conventional telephone at the same time to communicate with the party or parties with whom the D-HOH-SI person wants to communicate.

VRS calls require a human sign language interpreter to mediate communications between the D-HOH-SI party and the hearing party, which can be costly for calls that could be otherwise handled by an interactive response system. IVR systems are suited for calls, or portions of calls, that do not require a human agent, enabling companies to handle more calls at a lower cost. But IVR systems require voice communications. What is needed is an interactive response system adapted for D-HOH-SI calling parties that does not require voice/audio communications or a human agent for interaction.

SUMMARY OF THE INVENTION

Embodiments of the present invention are directed to an interactive sign language response (ISLR) system and method. The method includes receiving, by the interactive sign language response system, a video call from a videophone used by a video calling party, the video call including a video signal between the videophone and the interactive sign language response system; sending, by the interactive sign language response system and by way of the video call, a video prompt to be displayed on the videophone of the video calling party; and detecting, by the interactive sign language response system and by way of the video call, a response from the video calling party to the video prompt.

The interactive sign language response (ISLR) system includes a computer processor coupled to a computer bus; a network adapter coupled to the computer bus, the network adapter adapted to send and receive data over a telecommunications network; and a computer memory coupled to the computer bus. The computer memory is programmed with computer-executable instructions that, when executed by the computer processor, cause the interactive sign language response system to perform the steps of: receiving a video call from a videophone used by a video calling party, the video call including a video signal between the videophone and the interactive sign language response system; sending, by way of the video call, a video prompt to be displayed on the videophone of the video calling party; and detecting, by way of the video call, a response from the video calling party to the video prompt.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION

Embodiments of the present invention are directed to an interactive sign language response (ISLR) system and method. The ISLR system is adapted for D-HOH-SI calling parties and provides an interactive response system that does not require voice communications or a human agent for interaction.

Figure 2:
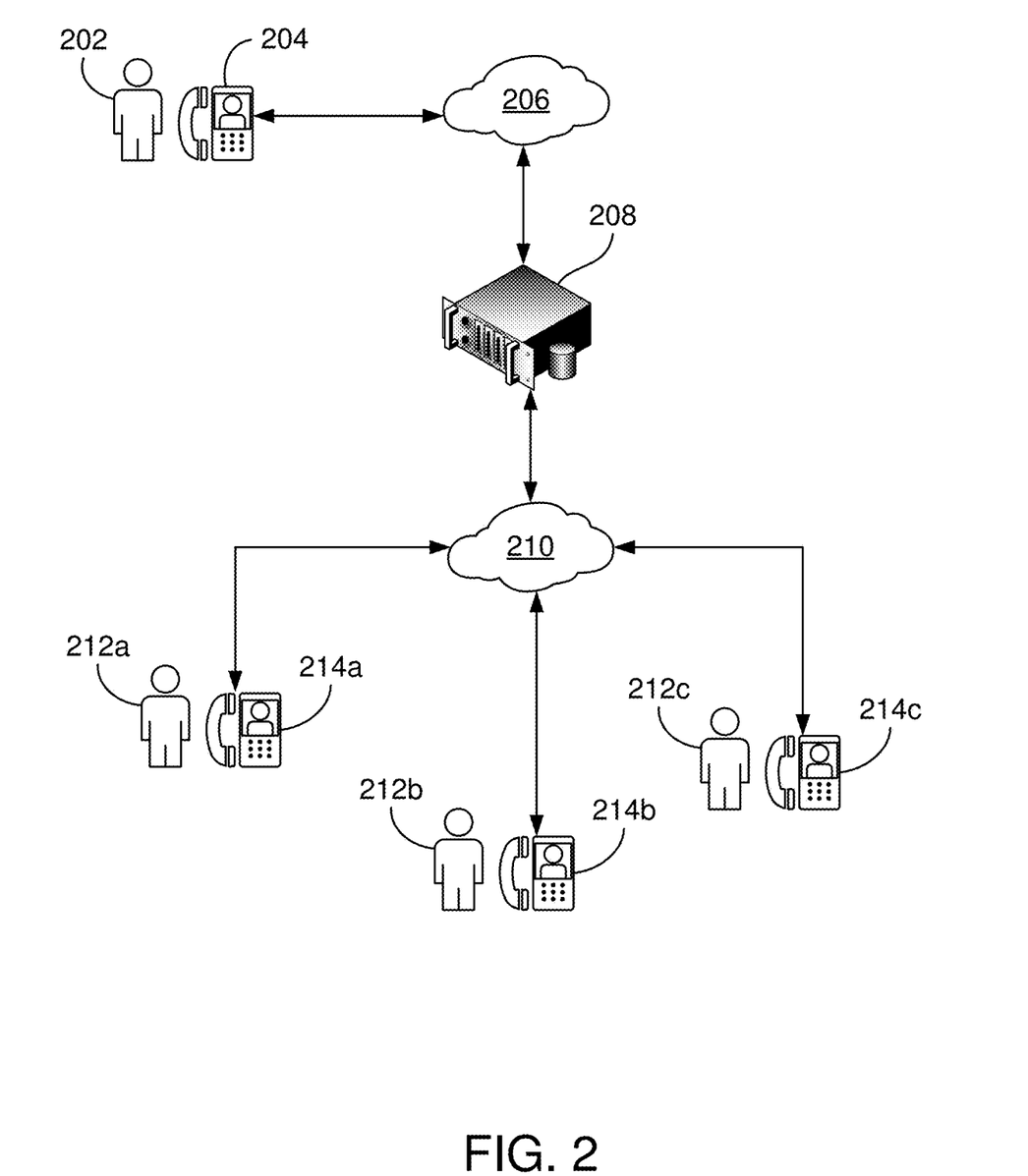
FIG. 2 shows an embodiment of an interactive sign language response (ISLR) system and its use.

FIG. 2 shows an embodiment of an interactive sign language response (ISLR) system and its use. Calling party 202 is deaf, hard-of-hearing, or speech impaired (D-HOH-SI). Calling party 202 may be unable to hear voice prompts from a prior art IVR system with sufficient clarity to comprehend the prompts. In addition, or in the alternative, calling party 202 may be unable to speak with sufficient clarity for a prior art IVR system to automatically recognize the responses of calling party 202.

Calling party 202 uses videophone 204 to place a video call via network 206 to ISLR system 208. Videophone 204 can be any device that is capable of sending and receiving video signals with sufficient fidelity suitable for video telephony. For example, videophone 204 can comprise discrete components such as a display, video camera, and transceiver coupled together in an application-specific solution. Videophone 204 can also comprise a network-connected computer, smartphone, or tablet executing a software application that enables video telephony. Network 206 can be any network suitable for video telephony including, but not limited to, packet switched networks, such as the Internet, and the public switched telephone network (PSTN). Videophone 204 can communicate with other devices on network 206, such as ISLR system 208, using any means suitable for video telephony including, but not limited to, voice over internet protocol (VOIP), session-initiated protocol (SIP), H.323 standard from the International Telecommunication Union Telecommunication Standardization Sector (ITU-T), and the like.

ISLR system 208 answers the call from calling party 202 and presents calling party 202 with one or more video prompts. Video prompts are received by videophone 204 and displayed to calling party 202. Video prompts can include requests for information from calling party 202, such as a language preference, account number, or a menu of calling options from which calling party 202 may select. Video prompts can comprise video representations of messages in text form. Video prompts can comprise playback of pre-recorded sign language messages. Video prompts can comprise both text and sign language, for example, a recorded sign language video with scrolling text superimposed on the recorded sign language video in a manner similar to closed captioning. Video prompts can include an interactive display element that can be selected by user input, as described in further detail below.

Calling party 202, upon seeing the voice prompts on videophone 204, responds to the prompts in a manner that ISLR system 208 automatically recognizes. For example, calling party 202 can perform gestures that ISLR system 208 automatically recognizes. ISLR system 208 is programmed to perform automatic gesture recognition. In at least one embodiment, ISLR system 208 is programmed to perform automatic sign language recognition, for example, American Sign Language (ASL). Calling party 202 performs the gestures within the visual field of the camera of videophone 204 and the video signal from videophone 204 is transmitted via network 206 to ISLR system 208. The gestures can be predetermined gestures such as gestures associated with a known sign language, such as American Sign Language (ASL). ISLR system 208 can be programmed to automatically detect sign language gestures and determine the response of calling party 202 based on the detected sign language gesture and its determined meaning (e.g., "yes", "no", "1", "2", "A", "B", "English", "Spanish", "Account Balance", "Customer Support", etc.). ISLR system 208 can include a graphics processing unit (GPU) that performs artificial intelligence (AI) pattern recognition and/or start to finish pattern/movement recognition to automatically recognize the gestures performed by calling party 202. For example, the ASL signs for "yes" and "no" require movement. The GPU of ISLR system 208 can recognize the movement and determine the gesture. The artificial intelligence of ISLR system 208 can be trained to more accurately recognize sign language gestures over time.

In addition to sign language recognition, ISLR system 208 can be programmed to automatically detect commonly-known gestures that are not sign language gestures and determine the response of calling party 202 based on the detected commonly-known gesture and its determined meaning (e.g., thumbs up meaning "yes"; thumbs down meaning "no", okay hand sign meaning "yes", one finger meaning "1", two fingers meaning "2", etc.). ISLR system 208 can be programmed to prompt the user for a specific gestures, automatically detect one of the specified gestures, and determine the response of calling party 202 based on the detected gesture and its specified meaning (e.g., wave right arm for "yes", wave left arm for "no", pointing up meaning "scroll up" in a menu, pointing down meaning "scroll down" in a menu, etc.).

In addition to detecting gestures performed by calling party 202, ISLR system 208 can also be programmed to recognize responses from user input devices associated with videophone 204. For example, in an embodiment where videophone 204 comprises a personal computer executing a software application, calling party 202 can respond to video prompts from ISLR system 208 using a keyboard and/or mouse of the personal computer. In an embodiment where videophone 204 comprises a smartphone executing a software application, calling party 202 can respond to video prompts from ISLR 208 system using a on screen keyboard and/or touch screen of the smartphone.

For example, the video prompt from ISLR system 208 may ask for an account number. Calling party 202, upon recognizing the video prompt, can enter the account number into videophone 204 using a keyboard and the account number can be detected by ISLR system 208. In another example, the video prompt from ISLR system 208 may include user-selectable interface item, such as a "yes" or "no" button displayed by the software application. Calling party 202, upon recognizing the video prompt, can select "yes" or "no" using the touch screen and the selection can be detected by ISLR system 208.

In addition to detecting gestures performed by calling party 202 and receiving information from user input devices, ISLR system 208 can also be programmed to recognize responses in the form of dual tone multifrequency (DTMF) tones associated with videophone 204. For example, calling party 202 can view video prompts from ISLR system 208 and respond with DTMF tones by using a phone keypad (real or virtual).

ISLR system 208 can recognize and determine the response of calling party 202 and take action based upon the determined response. If the determined response requires the call to be connected to a human call agent, ISLR system 208 automatically connects the call via network 210 to the next available human call agent 212*a-c* using telephone 214*a-c*. Network 210 can be a local area network or private exchange within the organization. Network 210 can also be the same wide area network as network 206, such as the internet or PSTN.

The embodiment in FIG. 2 shows ISLR system 208 deployed with a call center that is capable of receiving and servicing direct video calls via videophones 214*a-c* and human call agents 212*a-c*. Human call agents 212*a-c* are preferably trained to communicate in a manner suitable for D-HOH-SI calling party 202, such as using sign language. The embodiment of FIG. 2 is well-suited for organizations that have their own call centers and resources available for D-HOH-SI calling parties, or for organizations that contract with third-party vendors who have their own call centers and resources available to D-HOH-SI calling parties.

Figure 3:
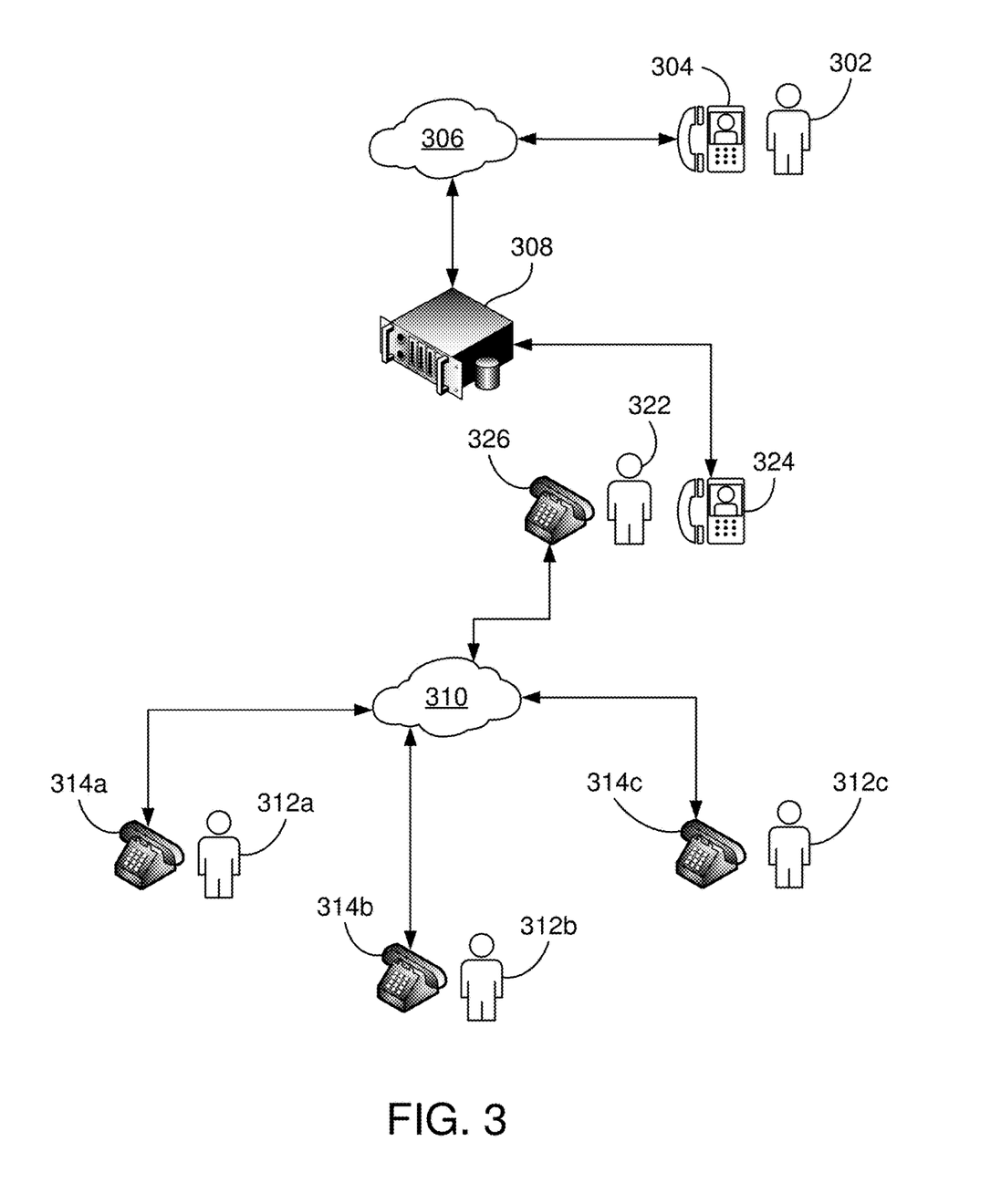
FIG. 3 shows an embodiment of an interactive sign language response (ISLR) system with video relay service (VRS)

FIG. 3 shows an embodiment of an interactive sign language response (ISLR) system with video relay service (VRS). D-HOH-SI calling party 302 uses videophone 304 to place a call via network 306 to ISLR system 308. ISLR system 308 answers the call from calling party 302 and presents calling party 302 with one or more video prompts. Video prompts are received by videophone 304 and displayed to calling party 302. Video prompts can include requests for information from calling party 302, such as a language preference, account number, or a menu of calling options from which calling party 302 may select. ISLR system 308 can recognize and determine the response of calling party 302 and take action based upon the determined response in a manner similar to that described above with respect to ISLR system 208 of FIG. 2.

If the determined response requires the call to be connected to a human call agent, ISLR system 308 automatically initiates a VRS call between calling party 302 and the next available human call agent 312*a-c*. VRS sign language interpreter 322 mediates the call between between D-HOH-SI calling party 302 and the next available called agent 312*a-c*, as is known in the art of video relay service. That is, VRS sign language interpreter 322 communicates in sign language with calling party 302 via videophones 304 and 324. VRS sign language interpreter 322 communicates in spoken language with the next available human call agent 312*a-c* via telephones 314*a-c* and 326.

The embodiment shown in FIG. 3 is well-suited for organizations that do not have their own call centers with resources available for D-HOH-SI calling parties and that do not contract with third-party vendors who have their own call centers with resources available to D-HOH-SI calling parties. VRS service can be provided by a third-party VRS provider specializing in VRS service. ISLR system 308 provides service to D-HOH-SI calling parties that can be handled without a human sign language interpreter, and the VRS service provides a human sign language interpreter when necessary. ISLR combined with VRS enables D-HOH-SI calling parties to communicate with human call agents who are not trained to communicate with D-HOH-SI calling parties (e.g., customer service representatives, technical support agents, and the like, who are trained and/or equipped only for audio calls).

Figure 4:
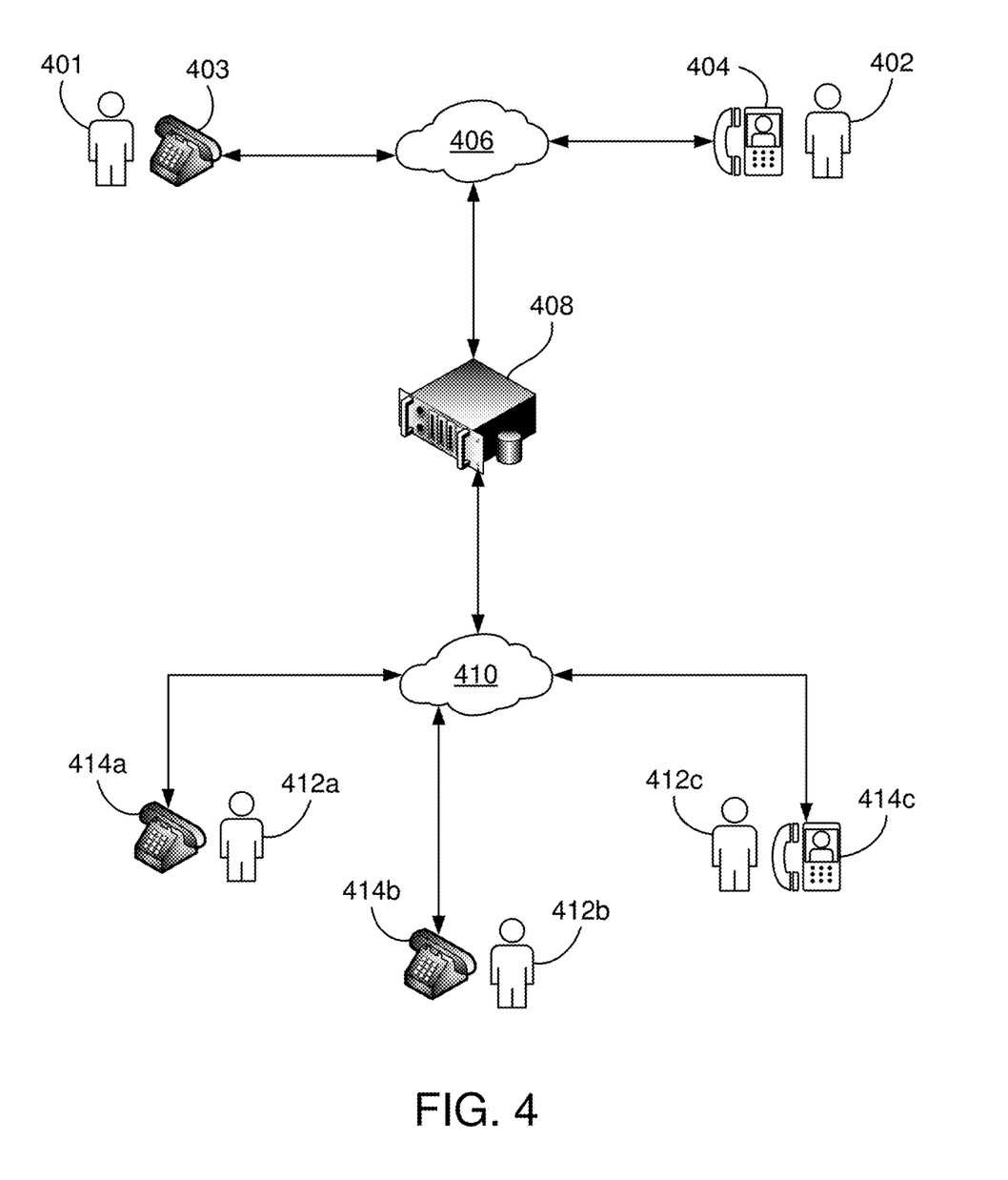
FIG. 4 shows an embodiment of an interactive sign language response (ISLR) system that can function as an IVR for calling parties who are not D-HOH-SI.

FIG. 4 shows an embodiment of an interactive sign language response (ISLR) system that can function as an IVR for calling parties who are not D-HOH-SI. ISLR system is programmed to discriminate between audio only calls from calling parties who are not D-HOH-SI and video calls from calling parties who are D-HOH-SI. For example, a call received at a phone number that is associated with standard telephone calls can be treated as an audio only call requiring only IVR. A call received at a phone number that is associated with videocalls can be treated as a videocall requiring ISLR.

In one instance, calling party 401, who is not D-HOH-SI, places a call using telephone 403 via public network 406 to ISLR system 408. ISLR system 408 determines that this call is a standard, audio only telephone call for which IVR audio prompts are sufficient. ISLR system 408 provides audio IVR prompts on the call. Calling party 401 responds with spoken language or with DTMF tones. ISLR system 408, operating in IVR mode for the call, determines the responses from calling party 401 using tone detection or automated speech recognition. If the determined response requires the call to be connected to a human call agent, ISLR system 408 automatically connects the call via network 410 to the next available human call audio-only agent 412*a-b* using telephone 414*a-b*.

In another instance, calling party 402, who is D-HOH-SI, places a call using telephone 404 via public network 406 to ISLR system 408. ISLR system 408 determines that this call videophone call requiring ISLR video prompts. ISLR system 408 provides video ISLR prompts on the call. Calling party 402 responds with sign language, other gestures, user input, DTMF tones, as described above with respect to FIG. 2. ISLR system 408, operating in ISLR mode for the call, determines the responses from calling party 402 as described above with respect to FIG. 2. If the determined response requires the call to be connected to a human call agent, ISLR system 408 automatically connects the call via network 410 to human video call agent 412*c* using videophone 414*c*. Alternatively, the call can be directed to a VRS provider for VRS service, as described above with respect to FIG. 3.

Figure 5:
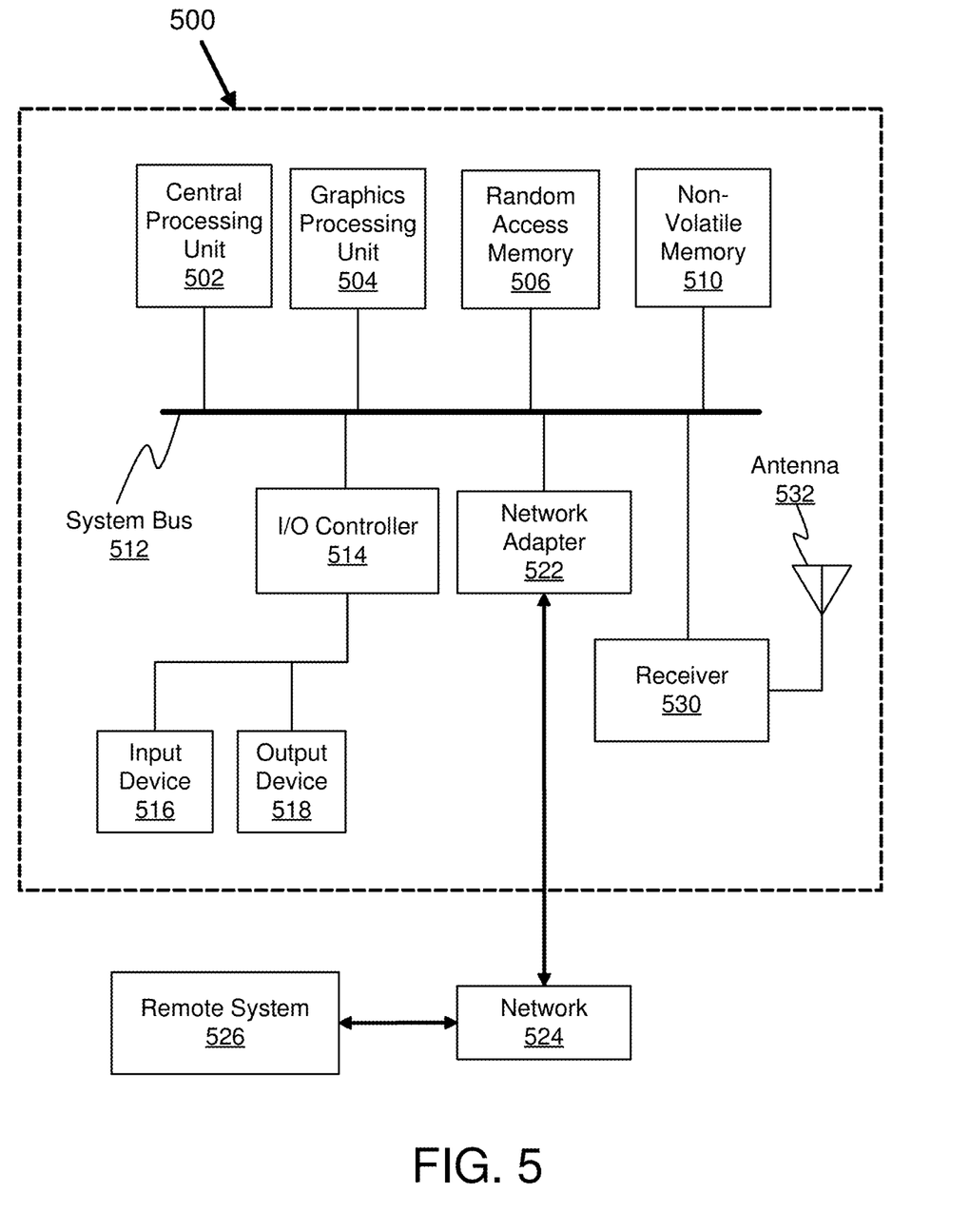
FIG. 5 is a block diagram showing an exemplary interactive sign language recognition (ISLR) system 500.

FIG. 5 is a block diagram showing an exemplary interactive sign language recognition (ISLR) system 500 suitable for use as IVRS systems 208, 308, and 408 described above. ISLR system 500 includes a central processing unit 502 having at least one microprocessor. Central processing unit 502 can be coupled directly or indirectly to memory elements through system bus 512. The memory elements comprise computer-readable memory capable of storing computer-executable instructions. The memory elements can include random access memory 506 employed during the actual execution of program code and non-volatile memory 510 for longer term storage of data and instructions. One or more input devices 516 and output devices 518 can be coupled to system bus 512 either directly or through an intervening I/O controller 514. Examples of input device 516 include, but are not limited to, a pointing device, such as a mouse or a trackpad, or a keyboard. Examples of input device 516 can also include camera and a microphone for recording and transmitting video signals and audio signals. Examples of output device 518 include, but are not limited to, a display screen or a printer. Input device 516 and output device 518 can be combined into a single device comprising a touchscreen comprising a display screen (for displaying information to the user of ISLR system 500) having a touch-sensitive surface (for receiving input from the user). ISLR system 500 also includes network adapter 522 to enable the system to become coupled to remote system 526 through intervening private or public networks 524. Modems, cable modems, Ethernet cards, and wireless network adapters are just a few of the currently available types of network adapters. ISLR system 500 can include one or more receivers 530. Receiver 530 receives wireless signals via antenna 532. Receiver 530 is adapted for receiving a data signal from a transmitting device. Receiver 530 can comprise a transceiver capable of both transmitting and receiving wireless data signals. While various component devices of computer system 500 are shown as separate devices in FIG. 5 for purposes of description, various component devices may be integrated into a single device as is known in the art, such as in a system-on-a-chip (SoC) device.

Some embodiments of the present invention can comprise a computer program encoded in a computer-readable memory of ISLR system 500. The computer program comprises computer-executable instructions that, when executed, causes the interactive sign language response system to perform the steps of method described herein. ISLR system 500 can be embodied in any suitable data processing system or computer system including, but not limited to, personal computers (PC), file servers, cloud computing systems, software-as-a-service (SaaS) systems, cellular telephones, smartphones, tablet devices, laptop computers, personal digital assistants, and the like.

Although the present invention and its advantages have been described in detail, it should be understood that various changes, substitutions and alterations may be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A computer-implemented method of providing an interactive sign language response system comprising:
   receiving, by the interactive sign language response system, a video call from a videophone used by a video calling party, the video call including a video signal between the videophone and the interactive sign language response system;
   sending, by the interactive sign language response system and by way of the video call, a video prompt to be displayed on the videophone of the video calling party;
   detecting, by the interactive sign language response system and by way of the video call, a response from the video calling party to the video prompt;
   automatically recognizing by the interactive sign language response system of a gesture in the response from the video calling party; and
   taking an action by the interactive sign language response system based upon the recognized response.

2. The method of claim 1 further comprising directing the video call to a human agent based on the response detected from the video calling party.

3. The method of claim 2 in which directing the video phone call to a human agent based on the response detected from the video calling party includes directing the video call to a video relay service provider.

4. The method of claim 1 further comprising:
   receiving, by the interactive sign language response system, an audio only call from a telephone used by an audio calling party, the audio only call including an audio signal between the telephone and the interactive sign language response system, the audio only call not including a video signal between the telephone and the interactive sign language response system;
   sending, by the interactive sign language response system and by way of the audio call, an audio prompt to be played by the telephone of the audio calling party; and
   detecting, by the interactive sign language response system and by way of the audio only call, a response from the audio calling party to the audio prompt.

5. The method of claim 1 in which the video prompt includes a video representation of a message shown in text form.

6. The method of claim 1 in which the video prompt includes playback of a pre-recorded sign language message.

7. The method of claim 1 in which the video prompt includes an interactive display element that can be selected by input from the video calling party.

8. The method of claim 1 in which automatically recognizing by the interactive sign language response system a gesture in the response from the video calling party includes automatically recognizing by the interactive sign language response system of a sign language gesture from the video calling party.

9. The method of claim 8 in which the sign language gesture automatically recognized by the interactive sign language response system is an American Sign Language (ASL) gesture.

10. The method of claim 1 in which automatically recognizing by the interactive sign language response system a gesture in the response from the video calling party includes automatically recognizing by the interactive sign language response system of a gesture that is not a sign language gesture.

11. The method of claim 1 in which automatically recognizing by the interactive sign language response system a gesture in the response from the video calling party includes automatically recognizing by the interactive sign language response system of an input from the video calling party, the input indicative of a selection of an interactive display element.

12. An interactive sign language response system comprising:
   a computer processor coupled to a computer bus;
   a network adapter coupled to the computer bus, the network adapter adapted to send and receive data over a telecommunications network;
   a computer memory coupled to the computer bus, the computer memory programmed with computer-executable instructions that, when executed by the computer processor, cause the interactive sign language response system to perform the steps of:
      receiving a video call from a videophone used by a video calling party, the video call including a video signal between the videophone and the interactive sign language response system;

sending, by way of the video call, a video prompt to be displayed on the videophone of the video calling party;

detecting, by way of the video call, a response from the video calling party to the video prompt;

automatically recognizing by the interactive sign language response system a gesture in the response from the video calling party; and taking an action by the interactive sign language response system based upon the recognized response.

13. The interactive sign language response system of claim 12 further programmed for directing the video call to a human agent based on the response detected from the video calling party.

14. The interactive sign language response system of claim 13 in which directing the video call to a human agent based on the response detected from the video calling party includes directing the video call to a video relay service provider.

15. The interactive sign language response system of claim 12 further programmed for:

receiving an audio only call from a telephone used by an audio calling party, the audio only call including an audio signal between the telephone and the interactive sign language response system, the audio only call not including a video signal between the telephone and the interactive sign language response system;

sending, by way of the audio call, an audio prompt to be played by the telephone of the audio calling party; and detecting, by way of the audio only call, a response from the audio calling party to the audio prompt.

16. The interactive sign language response system of claim 12 in which the video prompt includes a video representation of a message shown in text form.

17. The interactive sign language response system of claim 12 in which the video prompt includes playback of a pre-recorded sign language message.

18. The interactive sign language response system of claim 12 in which an interactive display element that can be selected by input from the video calling party.

19. The interactive sign language response system of claim 12 in which automatically recognizing by the interactive sign language response system a gesture in the response from the video calling party includes automatically recognizing by the interactive sign language response system of a sign language gesture from the video calling party.

20. The interactive sign language response system of claim 19 in which the sign language gesture automatically recognized by the interactive sign language response system is an American Sign Language (ASL) gesture.

21. The interactive sign language response system of claim 12 in which automatically recognizing by the interactive sign language response system a gesture in the response from the video calling party includes automatically recognizing by the interactive sign language response system of a gesture that is not a sign language gesture.

22. The interactive sign language response system of claim 12 in which automatically recognizing by the interactive sign language response system a gesture in the response from the video calling party includes automatically recognizing by the interactive sign language response system of an input from the video calling party, the input indicative of a selection of an interactive display element.

* * * * *